A. B. Corey,
Loom Harness.

No. 95,198.        Patented Sept. 28, 1869.

Witnesses       A. B. Corey,
S. N. Piper.      by his attorney
J. A. Snow,

United States Patent Office.

ALFRED B. COREY, OF PROVIDENCE, RHODE ISLAND.

Letters Patent No. 95,198, dated September 28, 1869.

IMPROVEMENT IN LOOM-HARNESS.

The Schedule referred to in these Letters Patent and making part of the same.

*To all persons to whom these presents may come:*

Be it known that I, ALFRED B. COREY, of the city and county of Providence, of the State of Rhode Island, have invented a new and useful Improvement in Loom-Harness; and do hereby declare the same to be fully described in the following specification, and represented in the accompanying drawings, of which—

Figure 1:
Figures 1 and 2 are front views of the eyes of loom-harness, as ordinarily formed, of twine.

In fig. 1, the harness-eye A is formed of two separate twines, $a\ b$, knotted together at the top and bottom of the eye, as shown at $c\ d$.

Figure 2:

In fig. 2, the eye A is formed of a single twine, $b$, doubled at its middle, and having its parts or halves knotted together at the upper part of the eye, as shown at $e$, the other or lower twine, $a$, of the harness being simply passed once through the eye, so as to go half round its lower part.

My improved harness is made with two twines, B C, the eye A′ being formed by doubling the upper twine B, and knotting or tying the halves of it together, as shown at $f$, the whole being like the method adopted in making the eye A, shown in fig. 2.

Figure 3:
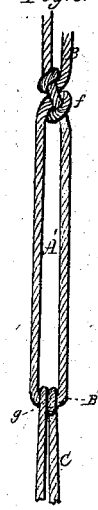
Figure 3 is a front view of a harness-eye, as made in accordance with my improvement.
Figure 4:

Instead, however, of carrying the lower twine C but once through the eye, as in fig. 2, so that such twine C may but partially encompass the lower part of the eye, I cause such twine C to wholly encompass the said lower part of the eye, that is, I pass the twine through the eye, and next wind it in a single coil entirely around the twine, or lower part of the eye, and next pass it through the eye a second time, the whole being as shown in fig. 3, and also in Figure 4, which shows the said twine C as wound one and a half time about the lower part B′, of the twine B.

When the harness, so made, is varnished, the coil $g$ will be securely fixed to the eye A′.

With my improvement, the twine C will be carried through the eye A′ twice with one coil, and one-half of a coil about the thread B of the eye A′.

By thus being coiled around the loop-twine, the twine C will be prevented from slipping up in the loop so as to enable the warp-thread, when the harness section may be in use, to come into contact with and wear the bottom of the loop, such being of frequent occurrence when a harness-section is made as shown in fig. 2.

It is desirable to avoid knots in a harness, as the more of them there may be, the more will be the danger of injury to the warps by them.

The eye of my harness-section, like that shown in fig. 2, has but one knot, therefore it possesses the advantages of that shown in such figure, relatively to the harness shown in fig. 1, whose eye has two knots.

Instead of simply looping the upper twine B, and winding the lower one, C, one coil and a half a coil about the vertex of the loop of the upper twine, the lower twine may be simply looped, and the upper be wound one coil and a half about the lower twine, at the vertex of the loop.

This is simply another mode in which I have contemplated the application of my improvement.

My improvement causes the harness to have other advantages, that is to say, it spreads the lower part of the eye better, and forms a rest or saddle to keep the warp-thread in the middle of the eye, while such warp-thread may be in the act of being raised by the eye.

It also causes the eye to stand so that its plane shall be nearer at right angles with the warp-thread than does either of the other harnesses as described.

What, therefore, I claim as my invention, is—

The improved loom-harness, as made with either twine wound with one coil and a half a coil about the loop of the other at the lower part of the warp-thread eye, the whole being substantially as described.

ALFRED B. COREY.

Witnesses:
R. H. EDDY,
J. R. SNOW.